US006060093A

United States Patent [19]
Davis et al.

[11] Patent Number: 6,060,093
[45] Date of Patent: *May 9, 2000

[54] CALCIUM SUPPLEMENTED FOODS AND FEEDING REGIMEN FOR CALCIUM SUPPLEMENTATION

[75] Inventors: Martin E. Davis, Tonka Bay; Pauline M. Olson; Anand Rao, both of Savage, all of Minn.

[73] Assignee: Davisco Foods International, Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,435

[22] Filed: Apr. 29, 1997

[51] Int. Cl.[7] ....................................................... A23L 1/304
[52] U.S. Cl. ........................... 426/74; 426/491; 426/549; 426/583; 426/615; 426/641; 426/648
[58] Field of Search .............................. 426/583, 74, 615, 426/641, 648, 549, 491

[56] References Cited

U.S. PATENT DOCUMENTS

| | | | |
|---|---|---|---|
| 3,791,283 | 2/1974 | Moreno et al. | 99/57 |
| 4,391,837 | 7/1983 | Kocher | 426/491 |
| 4,497,836 | 2/1985 | Marquardt et al. | 426/491 |
| 4,547,386 | 10/1985 | Chambers et al. | 426/583 |
| 4,710,387 | 12/1987 | Uiterwaal et al. | 426/72 |
| 4,738,856 | 4/1988 | Clark | 426/74 |
| 5,356,639 | 10/1994 | Jameson et al. | 426/40 |
| 5,468,506 | 11/1995 | Andon | 426/74 |

OTHER PUBLICATIONS

Schultz, H. et al. Symposium on Foods; Lipids and Their Oxidation, Avi Publishing Co., Inc. Westport, CN, p. 195, 1962.

"The Surgeon General's Report on Nutrition and Health", Rocklin, CA, 1998, p. 316–317.

Sherwin, C., "Use of Whey and Whey Products in Baked Goods", Davisco International, Inc., Technical Bulletin vol. XVII, Issue 11, Nov. 1995.

*Primary Examiner*—Helen Pratt
*Attorney, Agent, or Firm*—St. Onge Steward Johnston & Reens LLC

[57] ABSTRACT

A regimen for calcium supplementation takes advantage of the discovery that a calcium supplement containing modified whey characterized by a calcium content of at least 3%, protein content of from 10 to 20%, and a phospholipid content of at least 2%, is of high biological value. It can be accomplished with calcium-supplemented foods that administer foods containing sufficient amounts of the modified whey to provide at least 5% of the amount of calcium required for complete nutrition on a daily basis. The regimen can benefit humans and domestic pets, in particular. More preferred levels of administration will provide at least 10% and in some cases at least 25% of the RDA for calcium for the subject.

15 Claims, No Drawings

CALCIUM SUPPLEMENTED FOODS AND FEEDING REGIMEN FOR CALCIUM SUPPLEMENTATION

TECHNICAL FIELD

The invention relates to food products improved with a modified whey of novel composition as a calcium supplement, and a regimen for improving a mammalian diet by supplementing it with the modified whey.

Calcium is important in the diet of humans and other mammals. It plays a key role in a number of biological processes. For example, it is important to healthy bones and teeth. Calcium has proven to be needed throughout the mammalian life cycle. If the calcium naturally available in foods is not sufficient in quantity and quality to meet the body's needs, a variety of health problems can result and the need for a dietary supplement is indicated.

One problem with dietary supplements is that they generally are added expenses—they provide nutritional improvement to a food substrate, but they are not of functional importance in the food. Another problem with dietary supplements is that they are not all of high quality. Often, dietary supplements provide a poor balance between biological availability and cost factors such as functionality.

While a number of efforts have been made to provide low-cost, biologically-available calcium supplements, not all are equally effective and there is a need for a supplement that has high biological availability and can be used as a functional ingredient in a wide variety of foods.

BACKGROUND ART

Much is known and the significance of calcium to nutrition in general is not in question. However, many specific biological processes involving calcium and its availability from various sources, are not fully understood based on current research. See in this regard, The Surgeon General's Report On Nutrition and Health, 1988, e.g., at pages 316–317, relating to calcium absorption and retention.

Whey, as it is conventionally available, has been used as an ingredient for human and animal foods. See for example, G. Ranhotra, "Use Of Whey And Whey Products In Baked Goods", Technical Bulletin, Volume XVII, Issue Nov. 11, 1995. It is noted that conventionally-available whey products as described there have low protein, fat and ash contents. The ash contents are indicative of calcium concentrations of from about 1 to 2%, typical for commercial whey.

With typical, low contents of calcium and high concentrations of lactose, commercial sweet whey is often suggested for use in low amounts (2 to 6% of flour) in yeast-leavened bakery products to improve crust color tenderize crumb and improve color. The low calcium content balanced by the high lactose content makes it an impractical source of calcium for supplementing baked goods or other foods.

In distinction to conventional whey, a variety of modified whey products have been proposed for a number of food supplements. As noted above, and in U.S. Pat. No. 3,791,283, to Moreno, et al., whey can be concentrated to improve its protein content to make it more suitable for use as a protein supplement. In the noted patent disclosure, the protein is also specially treated to make it more stable in an acid beverage. However, the product is so low in remaining calcium as to make it impractical as a calcium supplement.

A number of whey-derived supplements have been proposed for mammals other than humans. For example, in U.S. Pat. No. 4,333,956, Juengst, et al., describe the use of fermented ammoniated condensed whey, mixed with calcium salts, as a feed supplement for ruminant animals. The supplement will be substantially more expensive than whey simply because it calls for a multi-step process in which whey is fermented in the presence of ammonia, concentrated and dried. The product is most suitable for ruminants, but would not be of wide use as a human food supplement.

In U.S. Pat. No. 4,547,386, Chambers, et al., describe another attempt to take advantage of whey for animal feed. There, whey is concentrated to a solids content of at least 45% and mixed with an additive such as calcium phosphate. After acidifying the mixture, it is dried and formed. Again, this product would not seem to have wide use as a human food ingredient or supplement. See also, U.S. Pat. No. 4,780,325, to Miller, for another whey product used as a feed supplement, and the citation of a number of related references.

Several other patents describe the use of whey products for dietary supplementation. For example, in U.S. Pat. No. 4,710,387, Uiterwaal, et al., describe a nutritional supplement for pregnant women that can contain whey and is said to offer a number of nutritional advantages, including increased the birth weight. The composition is, however, quite complex and costly as compared to whey, which is a low-cost byproduct of cheese making. See, for example, U.S. Pat. No. 5,356,639, to Jameson, et al. Unlike Uiterwaal, et al., who add casein back to whey after separation, Jameson, et al., have the objective of avoiding separation of the whey during the cheese making process. As with many prior art processes, Uiterwaal, et al., add calcium as a supplement apart from the whey—they do not use whey as the calcium source.

In U.S. Pat. No. 4,738,856, Clark describes some important factors concerning calcium in human nutrition and proposes a nondairy supplement to supply calcium, magnesium and potassium in a beverage solution. In U.S. Pat. No. 5,468,506, an extensive literature review of the subject of calcium supplementation of human foods is provided. Among the recognized calcium supplements are listed calcium carbonate, calcium lactate and calcium citrate. The above-cited patents and all of the references cited therein are hereby, specifically incorporated by reference herein in their entireties.

There remains a need for a calcium supplement that has high biological value and can be used in practical amounts in a wide variety of foods for functional effect. There further remains a need for a regimen for calcium supplementation that utilizes a calcium supplement of high biological value.

DISCLOSURE OF THE INVENTION

It is an object of the invention to provide food products containing a calcium supplement that has high biological value (bioavailability).

It is another object of the invention to provide a process for preparing food products containing a calcium supplement of high biological value.

It is a further object of the invention to provide food products improved by the use of a calcium supplement of high biological value that can be used in practical amounts for functional effect.

It is yet another object of the invention to provide a regimen for calcium supplementation that utilizes a calcium supplement of high biological value.

It is also an object of the invention to provide a variety of good-tasting, calcium-supplemented foods that can be used as part of a regimen to maintain a suitable calcium intake.

These and other objects are achieved by the present invention, which provides: a process for preparing food products containing a calcium supplement of high biological value, a regimen for calcium supplementation that utilizes a calcium supplement of high biological value, and calcium-supplemented foods that can be used as part of a regimen to maintain a suitable calcium intake.

The regimen for calcium supplementing a mammalian diet with calcium according to the invention, comprises: preparing one or more foods containing modified whey characterized by a calcium content of at least 3%, protein content of from 12 to 18%, and a phospholipid content of at least 2%; and administering to a mammal sufficient of the foods to provide at least 5% of the amount of calcium required for complete nutrition on a daily basis. The regimen can benefit humans and domestic pets, in particular. More preferred levels of administration will provide at least 10% and in some cases at least 25% of the RDA for calcium for the subject.

The process for preparing food products containing a calcium supplement of high biological value according to the invention, comprises: providing a food ingredient selected from the group consisting of meat, flour, fruit, vegetable and mixtures of two or more of these; mixing with the food ingredient, modified whey characterized by a calcium content of at least 3%, protein content of from 10 to 20%, and a phospholipid content of at least 2%; and cooking the resulting mixture of ingredients.

The calcium-supplemented food, that can be used as part of a regimen to maintain a suitable calcium intake, according to the invention comprise: a food ingredient selected from the group consisting of meat, flour, fruit, vegetable and mixtures of two or more of these; and modified whey characterized by a calcium content of at least 3%, protein content of from 10 to 20%, and a phospholipid content of at least 2%.

Many of the preferred aspects of the invention are described below.

INDUSTRIAL APPLICABILITY

The following description will describe the preparation of preferred calcium supplemented foods and processes and regimens according to the invention, including those highlighted above. The processing will be described in terms of the procedures effective for the materials employed in the various formulations. It will be understood by those skilled in the art, however, that some will have to be modified to accommodate them where necessary.

Basic to all of the embodiments of the invention is a "modified whey", which is defined as a whey fraction characterized by a calcium content of at least 3%, protein content of from 12 to 18%, and a phospholipid content of at least 2%. The calcium content is in highly soluble form and is homogeneously dispersed therein, as can be obtained by being codried with the protein, fat and sugar components separated to form the whey fraction. Calcium in this form is distinguished from calcium added as a salt that is simply mixed in dry form with whey. Preferred forms of modified whey are further characterized as conforming to the following analysis, based on a 100-gram sample.

| COMPONENT | PREFERRED | RANGE |
|---|---|---|
| Calories (Kcal) | 320 | 300–340 |
| Total Fat (g) | 4 | 2–5 |
| Saturated Fat (g) | 2.5 | 1–4 |
| Extractable Fat (g) (a) | 2 | 1–4 |
| Cholesterol (mg) | 100 | <200 |
| Total Carbohydrates (g) | 55 | 50–60 |
| Sugars (g) | 55 | 50–60 |
| Total Protein (g) | 14–16 | 10–20 (e.g., 12–18) |
| Calcium(g) | 5 | 3–10 (e.g., 4–6) |
| Sodium (g) | 1 | <2 |
| Iron (mg) | 0.5 | <1 |
| Riboflavin (g) | .8 | <1 |
| Phosphorus (g) | 2 | 1–3 |
| Potassium (g) | 1.5 | 1–2 |
| Magnesium (g) | .200 | <1 |
| Ash (g) | 20 | 15–25 |
| Moisture (g) | 5 | 1–6 |

(a) Substantially all fat is phospholipid.

a Substantially all fat is phospholipid.

Typical calcium to phosphorous ratios are within the range of from about 2:1 to about 10:1, e.g., about 5:2. Similarly, typical calcium to protein ratios are within the range of from about 1:4 to about 4:5, e.g., about 1:3. And, typical calcium to fat (essentially as phospholipid) ratios of from about 3:1 to abut 10:1, e.g., about 4:1.

Products meeting these specifications can be prepared from whey by fractionation and drying to obtain the noted composition. They are commercially available, for example, under the trademark VERSAPRO (various grades, including A, B, D, F, M, N, S) from Davisco Foods International, Inc., LeSueur, Minn.

Example 1, below reports a feeding study, which shows that modified whey is a calcium source of high biological value. To take advantage of this discovery of the invention, a number of food products can be formulated to include it in amounts that have biological, nutritional significance for the consumer, whether human or domesticated animal.

Preferably, human foods are prepared with modified whey in amounts sufficient to provide at least 5% of the RDA (Recommended Dietary Allowance as established by the National Research Council/National Academy of Sciences) for a person's age, sex and weight. Other embodiments will call for greater than 10%, and some concentrated nutritional supplements will call for at least 25% per serving.

These general guidelines can be illustrated in specific context by noting that the RDA for calcium for most humans is within the range of from about 800 to about 1500 mg per day. For example, where a normal adult male needs about 800 mg of calcium in the diet per day, a serving that contributes 5% of the RDA would require about 0.8 grams of modified whey, as defined above. And, one that contributes 10% of the RDA would require about 1.6 grams of modified whey. Proportionally, a serving needed to provide 25% of the RDA would contain about 4 grams of modified whey.

Among the food products that can be improved according to the invention are baked goods, other flour-based foods such as pasta and noodles, prepared entrees, gravies and sauces, meat extenders or extended meat products, and other foods, regardless of formulation, where the incorporation of modified whey can provide a significant source of nutrition. While snack foods can be included, those with high fat and/or salt contents are not, as with alcoholic beverages, considered effective vehicles for a nutritional supplement. An advantage of the invention is that the use of modified whey as a calcium supplement can enable reducing or eliminating egg yolks in some formulations and can have advantages in leavening, color and flavor in baked products.

Baked goods and doughs for their preparation, can be formulated as usual to contain modified whey and at least flour and water in reasonable amounts to form the desired dough for baking. Among baked goods are included cakes, cookies, crackers, breads, pan cakes, biscuits and other baked products of less-distinct grouping, Most doughs will also contain salt, sugar, fat or oil and leavening, such as yeast or baking powder. Some doughs made for extrusion contain no leavening and are expanded by extrusion. Baked goods can employ as much of the modified whey as can be tolerated by the particular product in terms of texture, taste and appearance. Typical levels of fortification will employ from 5 to 50% of the modified whey based on the weight of flour. Using at least 10% on this basis will generally have a significant nutritional impact.

Extended meats will generally contain meat and an extender comprising a proteinaceous (e.g., soy isolate, expanded soy or other vegetable protein, or carbohydrate ingredient (e.g., flour, comminuted baked goods, starch and/or sugar or starch hydrolysate).

Foods containing these amounts of modified whey are a desirable means to assure suitable calcium intake when employed as a regimen that calls for consuming, on a daily basis, sufficient amounts of food prepared with the modified whey to provide the indicated levels in the diet, e.g, at least 5, 10, or 25%, of the RDA.

Foods designed for domestic animals, however, are generally and preferably prepared as full-feeding foods, i.e., balanced in nutrition so that a diet limited to the particular feed will fulfill all of the animals nutritional needs. This goal is achieved based on following industry guidelines and actually testing formulations in appropriate feeding studies. Typically, a pet food formulation will contain protein, carbohydrates, fat, vitamins and minerals sufficient to meet the complete nutritional requirements of the pet.

The following Examples are provided to further illustrate and explain a preferred form of the invention and are not to be taken as limiting in any regard. Unless otherwise indicated, all parts and percentages are by weight.

EXAMPLE 1

This example reports the results of a feeding study designed to measure the biological value of the modified whey described above and to compare it to calcium supplements of recognized value, namely calcium carbonate, calcium lactate and a brand-named form of calcium citrate. The results of four test feeds show the feed fortified with modified whey to be the best.

The tests followed a recognized practice of feeding weanling male rats (Sprague-Dawley strain) a test diet, after a 2-day adaptation period. Four groups of ten were employed (one for each of the test diets), and baseline serum and calcium values were taken. Except for calcium which was employed at 75% of standard, each of the diets met NRC standards and was varied only as necessary to modify the calcium source. The results, normalized taking those for calcium carbonate as 100, are reported in the following table.

| Calcium Source | % Ca in Source | mg Ca/ 100 g Food | Biological Value |
|---|---|---|---|
| Ca Carbonate | 36.87 | 375 | 100 |
| Ca Lactate | 13.14 | 375 | 98.2 |
| Ca Citrate | 18.11 | 375 | 106.6 |
| Modified Whey | 4.87 | 375 | 109.8 |

EXAMPLE 2

This example illustrates the use of modified whey as a calcium supplement in baking powder biscuits, each biscuit providing 10% of the RDA of calcium for a human adult male.

| Ingredient | Amount |
|---|---|
| Flour | 2 cups |
| VersaPRO ® modified whey | 19.6 grams |
| Baking powder | 2 ½ teaspoons |
| Salt | 1 teaspoon |
| Vegetable shortening | ⅓ cup |
| Milk | ⅔ cup |

The flour, baking powder, modified whey and salt are first mixed and the shortening is blended into the resulting mixture. The milk is then added to form a soft dough that is kneaded lightly and then rolled to ½ inch thick and cut. The cut biscuits are baked at 425° F. until done. Each of 12 biscuits contains 10% of the RDA of calcium.

EXAMPLE 3

This example illustrates the use of modified whey as a calcium supplement in butter cookies.

A serving size can be adjusted, as desired, to achieve a calcium supplement within the ranges set out above.

| Ingredient | Amount |
|---|---|
| Flour | 1 cup |
| Sugar | ⅓ cup |
| Butter | 4 ounces |
| VersaPRO ® modified whey | 1 ounce |
| Egg | 1 |
| Salt | Pinch |
| Vanilla extract | ½ teaspoon |
| Citrus zest | ¼ teaspoon |

The butter and sugar are creamed, then the ingredients other than the flour are blended in and the flour is finally mixed in. The dough is preferably cooled prior to shaping into balls and flattening and is baked at 375° until the cookies are light brown at the edges.

EXAMPLE 4

This example illustrates the use of modified whey as a calcium supplement in a dry pet food for dogs.

Foods of this type are usually fed in requisite amounts for a dogs weight to provide the full nutritional requirements of the dog.

| Ingredient | Amount (Parts) |
|---|---|
| Whole ground corn | 30 |
| Whole ground soy | 21 |
| Wheat middlings | 20 |
| VersaPRO ® modified whey | 12 |
| Meat and bone meal | 11 |
| Tallow | 4 |
| Vitamin and mineral premix | 2 |

EXAMPLE 5

This example illustrates the use of modified whey as a calcium supplement in an intermediate moisture pet food for dogs.

Foods of this type are usually fed in requisite amounts for a dogs weight to provide the full nutritional requirements of the dog.

| Ingredient | Amount (Parts) |
|---|---|
| Meat byproducts | 25 |
| Soybean grits | 15 |
| Soybean oil meal | 15 |
| VersaPRO ® modified whey | 15 |
| Corn syrup | 15 |
| Propylene glycol | 5 |
| Vitamin and mineral premix | 2 |
| Color and flavor | 1 |
| Salt | 1 |
| Antimicotic | 1 |

The above description is intended to enable the person skilled in the art to practice the invention, It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A regimen for calcium supplementing a mammalian diet with calcium, comprising:
   preparing one or more foods containing modified whey characterized by a calcium content of at least 3%, protein content of from 10 to 20%, and a phospholipid content of at least 2%;
   administering to a mammal sufficient of the foods to provide at least 5% of the amount of calcium required for complete nutrition on a daily basis.

2. A regimen according to claim 1 wherein the mammal is a human.

3. A regimen according to claim 2 wherein the foods are administered in amounts sufficient to provide at least 10% of the RDA for calcium.

4. A regimen according to claim 2 wherein the foods are administered in amounts sufficient to provide at least 25% of the RDA for calcium.

5. A regimen according to claim 2 wherein at least one food is a baked product containing flour and from 5 to 50% of the modified whey, based on the weight of the flour.

6. A process for preparing food products containing a calcium supplement of high biological value, comprising:
   providing a food ingredient selected from the group consisting of meat, flour, fruit, vegetable and mixtures of two or more of these;
   mixing with the food ingredient, modified whey characterized by a calcium content of at least 3%, protein content of from 10 to 20%, and a phospholipid content of at least 2%; and
   cooking the resulting mixture of ingredients.

7. A process according to claim 6 wherein the food ingredient is flour and the modified whey is employed in an amount of at least 5% of the weight of the flour.

8. A process according to claim 6 wherein the food is a baked product comprising flour, and the modified whey is included in an amount of at least 10% of the weight of the flour.

9. A process according to claim 6 wherein the food ingredient is meat.

10. A process according to claim 6 wherein the food ingredient is fruit and/or vegetable.

11. A calcium-supplemented food, that can be used as part of a regimen to maintain a suitable calcium intake, comprising:
   a food ingredient selected from the group consisting of meat, flour, fruit, vegetable and mixtures of two or more of these; and
   modified whey characterized by a calcium content of at least 3%, protein content of from 10 to 20%, and a phospholipid content of at least 2%.

12. A food according to claim 11 intended for human consumption and including at least 5% of the RDA of calcium per serving portion.

13. A food according to claim 12, which comprises meat.

14. A food according to claim 12, which comprises flour.

15. A food product according to claim 12, which comprises fruit and/or vegetable.

* * * * *